Dec. 20, 1938.  F. W. SPERR, JR  2,140,605
RECOVERY OF HYDROCYANIC ACID
Filed June 25, 1937
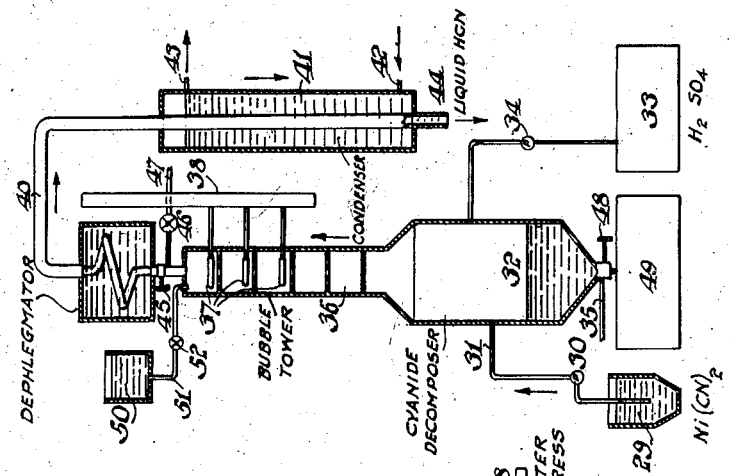
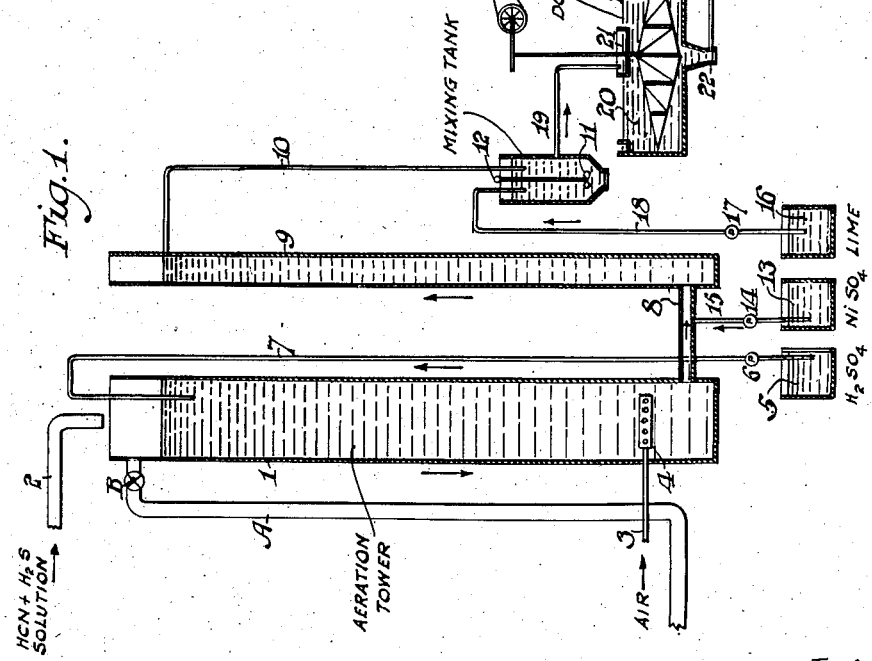
Inventor:
Frederick W. Sperr, Jr,
By John F. Bergin
Attorney.

Patented Dec. 20, 1938

2,140,605

UNITED STATES PATENT OFFICE 2,140,605

RECOVERY OF HYDROCYANIC ACID

Frederick W. Sperr, Jr., Vineland, N. J., assignor to Röhm & Haas Company, Philadelphia, Pa.

Application June 25, 1937, Serial No. 150,236

8 Claims. (Cl. 23—151)

This invention relates to a process for the recovery of hydrocyanic acid from gas mixtures containing it. More specifically it relates to the recovery of hydrocyanic acid from coke oven gases.

This application is a continuation-in-part of my copending application Serial No. 10,156 filed March 9, 1935, now Patent No. 2,088,003 granted July 27, 1937.

The present method depends on the fact that nickel cyanide is insoluble in water and by treating a dilute solution of hydrocyanic acid containing some hydrogen sulfide with a soluble nickel salt under proper conditions, all of the hydrocyanic acid may be precipitated and by subsequent treatment of this precipitate with an acid, the hydrocyanic acid and residual traces of hydrogen sulfide are set free and may be separated by fractional rectification in a suitable apparatus.

This process is carried out in two steps, the first of which comprises the preparation and separation of nickel cyanide in the form of a filter cake, and the second the treatment of this filter cake in a separate apparatus for the production of substantially pure hydrocyanic acid. It is possible to carry out the process continuously and this is the preferred form, particularly in cases where it is possible to regenerate the hydrocyanic acid in the same plant in which the nickel cyanide is formed.

Most by-product coke plants use the so-called direct process for the manufacture of ammonium sulfate in which the gas after the removal of the water, is passed through sulfuric acid. The ammonium sulfate which is formed crystallizes out and is recovered by centrifuging. The gas, which contains both hydrocyanic acid and hydrogen sulfide, leaving the sulfuric acid solution is usually at a temperature of about 50 to 60° C. This gas requires cooling which is generally accomplished by direct scrubbing with water. Practically all of the hydrocyanic acid produced in the coking process eventually passes unchanged through the sulfuric acid and if sufficient cooling water at a sufficiently low temperature is employed in a scrubber of adequate capacity, substantially all of the hydrocyanic acid in the gas is washed out, thus forming a very dilute solution which has hitherto been allowed to go to waste. This solution may contain from 0.10 to 0.25 gm. of hydrocyanic acid per liter and hydrogen sulphide equivalent to from 10 to 50% of the weight of the hydrocyanic acid present.

The object of this invention is to provide an economical process for recovering the hydrocyanic acid contained in these dilute solutions.

The present process may be carried out in the apparatus shown in the drawing in which—

Figure 1 shows an apparatus for the separation of hydrocyanic acid as nickel cyanide;

Figure 2, an apparatus for regenerating and collecting substantially pure hydrocyanic acid from the nickel cyanide formed in the apparatus shown in Figure 1.

If desired, most of the hydrogen sulphide in the dilute solution from the scrubbers may be removed by aeration, as described in my copending application Serial No. 734,420 filed July 9, 1934. In this case, the dilute solution is led to the top of a cylindrical tower 1, through pipe 2. Compressed air is blown into the tower at a point near the bottom through pipe 3 and distributor 4 which distributor may consist simply of a row of perforated pipes.

To provide for removal of any naphthalene scum that may accumulate at the top of the tower, pipe A with valve B may be installed. Valve B may be opened from time to time to allow water and scum to run off either to waste or to the sump which is usually provided for skimming naphthalene from gas cooler water.

To eliminate the last traces of hydrogen sulfide, a little chlorine or other oxidizing gas may be added to the air in pipe 3. I may, however, permit the small amount of hydrogen sulfide to remain and be precipitated as nickel sulfide, which will be decomposed as described below.

The water passes out of the bottom of the tower through pipe 8 into vertical pipe 9 having an overflow 10, the height of which is adjusted to maintain a suitable constant level in the tower 1. The water flows from pipe 10 into mixing tank 11 equipped with agitating means 12.

A solution of nickel sulfate is pumped from tank 13 by pump 14 through pipe 15 into pipe 8 and becomes thoroughly mixed with the water as it flows upward through pipe 9. Milk of lime contained in tank 16 is pumped by pump 17 through pipe 18 into the mixing tank 11. Thorough mixing of the lime with the water at this point facilitates the efficient precipitation of nickel cyanide and its efficient removal in the subsequent apparatus.

In practice I have found that best conditions for the efficient precipitation of nickel cyanide are obtained when the nickel sulfate solution is added at such a rate as to supply from 10 to 20% more nickel sulfate than is theoretically necessary to combine with the sum of the hydrogen sulfide and hydrocyanic acid present. The milk of lime is then added at such a rate as to maintain a pH of 6.9 to 7.6 in the water leaving mixing tank 11. Fair results may be obtained within a pH range of 6.8 to 8.2, but out of this range the amounts of hydrocyanic acid and nickel lost in the final effluent increase unduly. The nickel salt and lime or other alkali can be added in any desired order.

Pumps 6, 14 and 17 may have automatic controls to regulate the rate of chemical additions proportionately to the rate of flow of cooler water. It is better, however, to maintain a constant rate of pumping the cooler water and a constant rate of operating pump 14 handling the nickel sulfate solution, while making pumps 6 and 17 automatically responsive to variations of hydrogen ion concentration in the water.

The water flowing out of mixing tank 11 contains a precipitate consisting principally of nickel cyanide, with some nickel hydroxide, nickel carbonate and calcium carbonate. A small amount of nickel sulfide may also be present. This water flows through pipe 19 into a Dorr thickener 20. Any other efficient type of thickener may be used, the purpose being to obtain the precipitated material in the form of a fairly concentrated slurry and producing a clear effluent which may be run to waste or used for gas cooling or other purposes. The water with precipitate flows into feed well 21 from which it overflows into the thickener tank. The solids drop to the bottom of the thickener and are collected in the well 22 by the action of the sweeps, while the clear effluent overflows into the annular trough 23 and thence to outlet pipe 24.

My complete invention contemplates the utilization of the nickel cyanide for the manufacture of hydrocyanic acid, with the production of a nickel sulfate solution which is returned to the water-treating process. If the hydrocyanic acid is to be manufactured in or near the by-product coke plant producing the cooler water, the slurry from the Dorr thickener may be used without further treatment. If the hydrocyanic acid is to be made in a separate plant and at some distance from the point of treating the cooler water, it will be desirable to filter the slurry in order to avoid transportation of excessive amounts of water. In the apparatus shown in Figure 1 the slurry is pumped by pump 25 through pipe 26 into filter 27, the filtrate passing out through pipe 28. The filter cake is then transported to the hydrocyanic acid plant.

The essential features of the hydrocyanic acid plant are shown in Figure 2. Weighed amounts of the nickel cyanide filter cake are placed in tank 29 to which is added sufficient water to make a thick slurry which is pumped by pump 30 through pipe 31 to the decomposer 32. Into this sulfuric acid is pumped or blown from tank 33 through pipe 34, the amount of acid required being usually about twice the equivalent of the amount of nickel in the contents of the decomposer. Steam is blown into the decomposer through pipe 35 and indirect steam heating may also be employed.

The hydrocyanic acid and water vapor pass upward through the column 36 which may consist of several bubbling sections, the top sections preferably being equipped with cooling coils 37 supplied with water from pipe 38. Much of the water vapor is caught in this column and returned to the decomposer. The concentrated hydrocyanic acid gas then passes through a dephlegmator 39 containing cooling coils, also supplied with water from pipe 38. This dephlegmator removes most of the remaining water. The hydrocyanic acid gas then passes through pipe 40 into condenser 41 containing cooling coils or sections cooled with refrigerated brine which enters at 42 and leaves at 43. Liquid hydrocyanic acid passes out through pipe 44 and is collected in suitable containers.

After completion of decomposition of the nickel cyanide and expulsion of the hydrocyanic acid so far as practicable, valve 45 is closed and valve 46 opened and the decomposer and column are thoroughly purged with steam which passed out through pipe 47 carrying any residual hydrocyanic acid. This may be scrubbed out in a small water-scrubber and precipitated with lime and nickel sulphate or recovered in some other manner.

The acid nickel sulphate liquor, free from hydrocyanic acid, is removed from the decomposer by opening valve 48 and allowing the liquor to run into tank 49. As the nickel cyanide filter cake usually contains calcium carbonate and possibly calcium sulphate, the acid nickel sulphate liquor may contain a substantial amount of insoluble calcium sulphate. It is usually desirable to remove this by sedimentation or filtration before transferring the nickel sulfate liquor to tank 13 in Figure 1, where it is used in the recovery of additional nickel cyanide.

The gas cooler water usually contains naphthalene, some of which may contaminate the nickel cyanide precipitate. It is desirable to remove such naphthalene from the filter cake so as to avoid contamination of the hydrocyanic acid and possible stoppage of parts of the decomposing apparatus. For this purpose the filter cake may be thoroughly steamed before removing it from the filter 27, or else it may be steamed in tank 29.

Unless the aeration treatment of the gas cooler water for removal of hydrogen sulfide is supplemented by treatment with oxidizing agents or other reactive substances added to the water simultaneously with, or immediately following, aeration, the nickel cyanide precipitate will contain small amounts of nickel sulfide which will be converted into hydrogen sulfide in the decomposer. For many purposes this will do no harm; but where it is desired to completely eliminate all traces of hydrogen sulfide, I have found that this may be effectively accomplished by adding an oxidizing agent, such as a permanganate or bichromate, to the nickel cyanide slurry in decomposer 32 before or simultaneously with the addition of the sulfuric acid. Alternatively the solution of the oxidizing agent may be added to the top section or one of the upper sections of column 36, the addition being made from tank 50 through pipe 51 and valve 52. Best results are obtained by using twice as much bichromate or permanganate as is theoretically required to oxidize the hydrogen sulfide evolved; but as very small amounts of nickel sulfide are present, the cost of this excess of oxidizing agent is inconsiderable.

Instead of removing hydrogen sulfide from the gas cooler water by aeration or other means preliminary to precipitation of nickel cyanide, I may permit such hydrogen sulfide to remain and be precipitated as nickel sulfide simultaneously with the precipitation of the nickel cyanide. In the subsequent treatment of the precipitate with sulphuric acid, advantage may be taken of the fact that the rate of decomposition of nickel sulphide by acids is much slower than that of nickel cyanide. For example, samples of unaerated gas cooler water containing 0.15 to 0.17 gram of hydrogen sulphide per liter were precipitated with nickel sulphate and lime and the precipitate was filtered off and distilled with an excess of normal sulphuric acid. After ten minutes, 85–93% of the hydrocyanic acid had distilled over; but this was accompanied by only 0.5–1.5% of the original hydrogen sulphide.

In the practical application of this, the heating of the contents of the decomposer 32 may be stopped when approximately 90% of the hydrocyanic acid is expelled and the contents may be transferred to another vessel where they may be heated for a longer perior until all of the nickel sulphide is decomposed. The gases from this second vessel may be burned to prevent danger from the hydrocyanic acid, or else may be conveyed to the stream of coke oven gas entering the final cooler where the hydrocyanic acid will be absorbed.

Instead of separating the hydrogen sulphide as just described, I may employ methods similar to those stated in copending application Serial No. 10,156; viz:—

First, I may scrub the gases evolved from the decomposer with a portion of the nickel cyanide slurry obtained in the precipitation process, the action being similar to that of zinc cyanide as described in the copending application.

Second, I may separate hydrogen sulphide gas from the liquid hydrocyanic acid produced in the condensing apparatus, taking advantage of the fact that the temperature of condensation of hydrocyanic acid gas is much higher than that of hydrogen sulphide. The apparatus preferred for carrying out these methods has been described in the copending application.

As stated in the foregoing descriptions, I employ lime as the alkaline precipitating agent in conjunction with nickel sulfate for the production of nickel cyanide, the accurate control of the hydrogen ion concentration being essential to the success of the process. Other alkaline agents may be substituted for lime provided they do not form nickel compounds which do not react or react too slowly with hydrocyanic acid. For example, I have successfully used sodium hydroxide, magnesia and ammonia. The substitution of ammonia for lime may be economical in many by-products coke plants.

Since hydrocyanic acid is a very weak acid, any of a large number of water soluble acids can be used to regenerate hydrocyanic acid from the insoluble cyanide. For example, hydrochloric acid may be used and sulfur dioxide may also be employed to decompose the nickel cyanide. The latter is particularly advantageous because of its well known influence in retarding or preventing the decomposition of hydrocyanic acid.

This invention is not confined to the specific form of apparatus shown because other units of equal function may be substituted for any of the units of this apparatus. The operating conditions such as temperature, pressure, rate of flow and relative proportion of reagents, may also be varied within the scope of the following claims.

I claim:

1. The process of recovering hydrocyanic acid from gases containing it which comprises scrubbing the gases with water to form a dilute aqueous solution of the hydrocyanic acid, treating it with a soluble nickel salt to precipitate nickel cyanide from an approximately neutral solution, separating the nickel cyanide thus precipitated from the water, and treating it with an acid which will regenerate the hydrocyanic acid.

2. The process of recovering hydrocyanic acid from gases containing it which comprises scrubbing the gases with water to form a dilute aqueous solution of the hydrocyanic acid, treating it with a soluble nickel salt at a pH of 6.8 to 8.2 to precipitate nickel cyanide, separating the nickel cyanide from the water and treating it with sulfuric acid to regenerate the hydrocyanic acid.

3. The process of recovering hydrocyanic acid from gases containing it which comprises scrubbing the gases with water to form a dilute aqueous solution of the hydrocyanic acid, treating it with a soluble nickel salt and sufficient alkali to adjust the pH to 6.8 to 8.2 in order to precipitate nickel cyanide, separating the nickel cyanide from the water and treating it with sulfuric acid to regenerate the hydrocyanic acid.

4. The process of recovering hydrocyanic acid from gases containing it which comprises scrubbing the gases with water to form a dilute aqueous solution of the hydrocyanic acid, treating it with a soluble nickel salt and sufficient lime to adjust the pH to 6.8 to 8.2 in order to precipitate nickel cyanide, separating the nickel cyanide from the water and treating it with sulfuric acid to regenerate the hydrocyanic acid.

5. The process of recovering hydrocyanic acid from gases containing it which comprises scrubbing the gases with water to form a dilute aqueous solution of the hydrocyanic acid, treating it with nickel sulfate and adding milk of lime to adjust the pH to 6.8 to 8.2, thus precipitating the nickel cyanide, separating the nickel cyanide from the water, treating it with sulfuric acid to regenerate the hydrocyanic acid, and condensing the hydrocyanic acid.

6. The process of recovering hydrocyanic acid from gases which also contain hydrogen sulfide which comprises scrubbing the gases with water to form a dilute aqueous solution of hydrocyanic acid, aerating said solution to remove most of the absorbed hydrogen sulfide, treating said solution with a soluble nickel salt at a pH of from 6.8 to 8.2, separating the precipitated nickel cyanide from the water, and treating it with an acid which will regenerate the hydrocyanic acid.

7. The process of recovering hydrocyanic acid from gases which also contain hydrogen sulfide which comprises scrubbing the gases with water to form a dilute aqueous solution of hydrocyanic acid, treating it with a soluble nickel salt at a pH of 6.8 to 8.2 to precipitate nickel cyanide and nickel sulfide, separating the precipitate from the water and treating it with an acid which will regenerate the hydrocyanic acid, said acid treatment being discontinued when the bulk of the hydrocyanic acid has been liberated and before the nickel sulfide is substantially affected.

8. The process of recovering hydrocyanic acid from gases which also contain hydrogen sulfide which comprises scrubbing the gases with water to form a dilute aqueous solution of hydrocyanic acid, treating it with a soluble nickel salt and sufficient lime to adjust the pH to from 6.8 to 8.2, separating the precipitated nickel cyanide and nickel sulfide from the water and treating the precipitate with dilute sulfuric acid, said acid treatment being discontinued when the bulk of the hydrocyanic acid has been liberated and before the nickel sulfide is substantially affected.

FREDERICK W. SPERR, Jr.